United States Patent [19]
Hirose

[11] Patent Number: 5,832,136
[45] Date of Patent: *Nov. 3, 1998

[54] IMAGE SIGNAL PROCESSING APPARATUS WITH NOISE SUPERIMPOSITION

[75] Inventor: Yoshitsugu Hirose, Kanagawa, Japan

[73] Assignee: Fuji Xerox Co., Ltd., Tokyo, Japan

[ * ] Notice: The term of this patent shall not extend beyond the expiration date of Pat. No. 5,557,429.

[21] Appl. No.: 421,788

[22] Filed: Apr. 14, 1995

[30]  Foreign Application Priority Data

Apr. 20, 1994 [JP] Japan ................................ 6-081889

[51] Int. Cl.⁶ ........................................................ G06K 9/40
[52] U.S. Cl. ................................................ 382/275; 358/462
[58] Field of Search ........................................ 382/275, 242, 382/254, 263, 248; 358/447, 454, 461, 463, 462; 348/620, 606

[56]  References Cited

U.S. PATENT DOCUMENTS 5,008,752  4/1991  Van Nostrand ......................... 358/462
5,557,429  9/1996  Hirose ..................................... 382/275

FOREIGN PATENT DOCUMENTS

Hei. 3-234178  10/1991  Japan .
Hei. 5-114999  5/1993  Japan .

OTHER PUBLICATIONS

Sei–ichi Taguchi and Satoru Honjo, "Quality of Digital Images," The Fifth International Congress on Advances in Non–Impact Printing Technologies, Nov. 12–17, 1989, pp. 383–389.

Yoshitsugu Hirose, "Perceptual Characteristics of Image Noise in Color Hardcopy Images UDC 621.397:778:1:535.6," 1993.

Sei–ichi Taguchi & Satoru Honjo, "Quality of Digital Images," The Fifth International Congress on Advances in Non–Impact Printing Technology, Nov. 12–17, 1989, pp. 383–389.

Primary Examiner—Dwayne Bost
Assistant Examiner—Brian L. Johnson
Attorney, Agent, or Firm—Finnegan, Henderson, Farabow, Garrett & Dunner, L.L.P.

[57]  ABSTRACT

Noise that is hard for human vision to perceive and corresponds to the kind of an original document is superimposed on an input image signal by an amount corresponding to the kind of the original document. More specifically, a noise selection circuit selects a spatial frequency characteristic and an amplification value table that conform to the kind of an original document. Based on the selected characteristic and table, a noise amount calculation circuit calculates a noise amount corresponding to the image signal. A noise superimposing circuit superimposes the noise thus generated on the image signal.

4 Claims, 10 Drawing Sheets

IMAGE SIGNAL PROCESSING APPARATUS WITH NOISE SUPERIMPOSITION

BACKGROUND OF THE INVENTION

The present invention relates to an image signal processing apparatus which is used in, for instance, a color copier and which can reproduce an image superior in visual performance irrespective of the kind of an original document.

The characteristics that are important in evaluating the image quality of an output image of a color copier etc. include the color reproduction performance, gradation reproduction performance, sharpness and graininess. There have been proposed so far many image processing techniques for reproducing an original document image in a faithful manner.

By the way, if a color output image is considered to be an information transfer means, the final receiving system of the image is the human visual system. Therefore, it is desired that in the above image processing be implemented in terms of the image quality in consideration of the perceptual characteristics of the visual system that operates based on phenomena of visual psychology. This is supported by several articles. For instance, there is an report stating that faithful color reproduction can be obtained by performing a color correction in the L*a*b* space, which is a color perception uniform space. There is another report stating that a high-contrast image can be obtained by designing a sharpness enhancing filter based on the spatial frequency characteristic of the visual system. A specific example of performing image processing in a uniform color space is a technique disclosed in Japanese Unexamined Patent Publication No. Hei. 3-234178.

However, generally, the image noise processing that determines the graininess of an image still remains in the technical level of satisfying both of the sharpness and the graininess by cutting a high-frequency band of a sharpness enhancing filter.

On the other hand, there is an article by Honjo et al. entitled "Quality of Data Images" in which a relationship between the image noise and the gradation performance is derived from the visual characteristics (Preceedings of the 5th Intern. Congr. on Advances in Non-impact Printing Technologies (SPSE), held in San Diego, Calif., November 1989, pp. 383–389). This paper states that the existence of noise provides an effect of shielding a gradation step, i.e., a quasi-outline. This basic concept is already utilized widely as the dither method in the halftone generation, for instance.

Recently, an image signal processing apparatus has been proposed which can not only improve the gradation reproduction performance without deteriorating the hue or sharpness but also reduce, when recognized by human vision, image noise due to an original document by positively superimposing noise that is less recognizable by human vision on an image signal based on considerations of the noise perceptual characteristics of the visual system. However, in this method, the same amount of noise is superimposed irrespective of the degree of graininess of an original document. Therefore, the image quality, as recognized by human vision, of a reproduced image of an original document having good graininess might become worse than in the case of not employing the above method.

As described above, although several image signal processing methods based on phenomena of visual psychology for image noise processing have been proposed conventionally for image noise processing, there has not been proposed any conclusive technique which can reduce only image noise without deteriorating other image quality characteristics for original documents of any graininess level.

SUMMARY OF THE INVENTION

An object of the present invention is to provide an image signal processing apparatus which can not only improve the gradation reproduction performance for an original document of any graininess level without deteriorating the hue or sharpness but also reduce image noise, when recognized by human vision, due to an original document by superimposing a small amount of high-frequency-band noise that is less recognizable by human vision on an image signal when an original document (such. as a printed document or a photographic document) includes little image noise and, conversely, positively superimposing random noise excluding a very-low-frequency-band component on an image signal when an original document (such as an generation image) includes image noise.

Figure 1A:
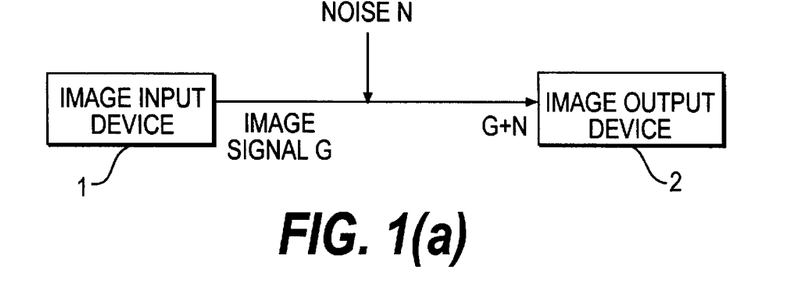
FIG. 1(a) shows the concept of an image signal processing apparatus according to the present invention.

FIG. 1(a) shows the concept of an image signal processing apparatus according to the invention. An image signal G produced by an image input device 1 is converted to an image signal suitable for an image output device 2 in the following manner. Noise N that is hard for human vision to perceive and corresponds to the kind of an original document is superimposed on the image signal G by an amount corresponding to the kind of the original document. The noise-superimposed image signal is input to the image output device 2.

Figure 1B:
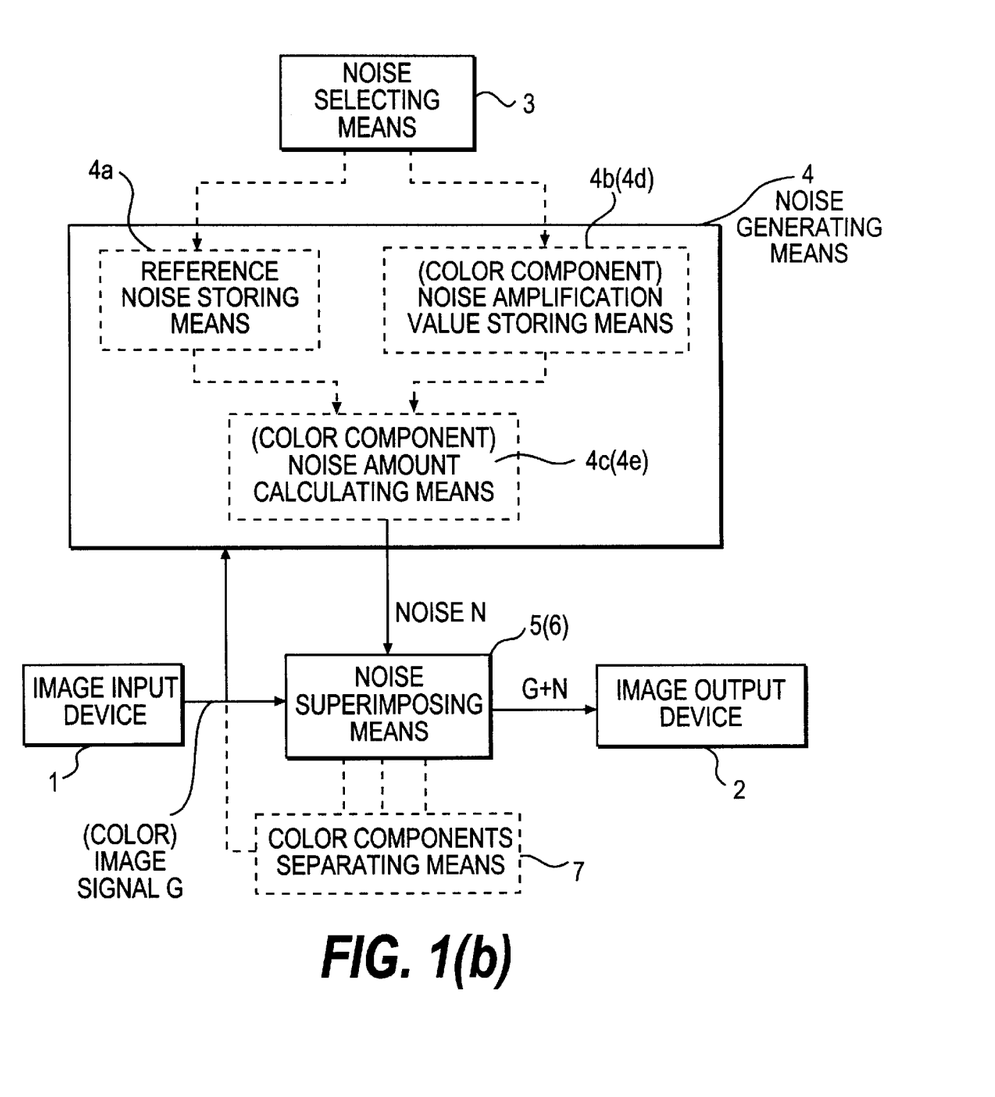
FIG. 1(b) outlines a configuration of the image signal processing apparatus according to the invention.

FIG. 1(b) shows an apparatus as an implementation of the above concept. That is, an apparatus for converting an image signal G that is produced by an image input device 1 to an image signal suitable for an image output device 2 consists of the following components. A noise selecting means 3 selects a spatial frequency characteristic and an amplification value table that conform to the kind of an original document. Based on those selected data, a noise generating means generates noise N of an amount corresponding to the image signal G. A noise superimposing means 5 superimposes the noise N on the image signal G.

In this apparatus, if necessary, the noise generating means 4 may be modified while maintaining the feature of generating noise that corresponds to the kind of an original document and has such a spatial frequency characteristic as to be hard for human vision to perceive. However, to allow finer control to be performed more easily, it is preferred that the noise generating means 4 be constructed as follows. A reference noise storing means 4a stores a plurality of noise data having respective spatial frequency characteristics that correspond to kinds of original documents. A noise amplification value storing means 4b stores a plurality of noise amplification value tables corresponding to kinds of original documents. A noise selecting means 3 selects noise data and a noise amplification value corresponding to the kind of an original document. A noise amount calculating means 4c calculates the amount of noise N which amount corresponds to the level of an image signal.

To retain a plurality of noise data having respective spatial frequency characteristics that correspond to kinds of original documents and a plurality of noise amplification value tables that also correspond to kinds of original documents, it is preferred to employ two kids of parameters: parameters for a characteristic corresponding to original documents (such as a printed document and a photographic document) including little image noise, and parameters for a characteristic corresponding to original documents (such as copy images discharged from particular machines, i.e., generation images) including image noise.

In dealing with a color image signal, it is preferred to employ, as in the apparatus shown in FIG. 1(b), a noise superimposing means 6 for superimposing, on a color image signal G, noise N that is generated by the noise generating means 4 and is in a color space region hard for human vision to perceive.

In dealing with a color image signal, since perceptual characteristics with respect to noise are different for respective color components, it is preferred that the apparatus is so designed as to be capable of fine control of the noise superimposition, to provide an image better in visual performance. For example, the apparatus may be designed such that slight noise is superimposed on a color component for which perceptual characteristics with respect to noise are high and much noise is superimposed on a color component for which perceptual characteristics with respect to noise are low. Alternatively, noise may be superimposed on color components for which perceptual characteristics with respect to noise are low.

The designing of the above-described mode may be effected, for instance, by employing the following components as shown in FIG. 1(b). A color components separating means 7 separates a color image signal into color components in a color space. A noise superimposing means 6 superimposes noise N independently on each of the color signal components as separated by the color components separating means 7.

Further, in the case of setting a noise amount independently for each color component, the following components may be employed as the noise generating means 4 as shown in FIG. 1(b). A reference noise storing means 4a stores in advance noise data that correspond to kinds of original documents and have such spatial frequency characteristics as to. be hard for human vision to perceive. A color component noise amplification value storing means 4d stores noise amplification values for the respective color signal components as separated by the color components separating means 7. A color component noise amount calculating means 4e calculates the amount of noise to be superimposed on each color signal component based on the noise data stored in the reference noise storing means 4a and the noise amplification values stored in the color component noise amplification value storing means 4d. Each of the color component noise amplification value storing means 4d and the color component noise amount calculating means 4e may be provided either separately for each color component, or as a single unit for all of the color components.

The operation of the apparatus having the above constitution will be described with reference to FIG. 1(b).

Referring to FIG. 1(b), the noise selecting means 3 selects noise data to be superimposed and an amplification value table in accordance with the kind of an input image. The noise generating means 4 generates noise N of an amount corresponding to the level of an image signal G based on the noise data and the amplification value table called by the noise selecting means 3. The noise superimposing means 5 or 6 superimposes the noise N on the image signal G. Although the superimposed noise N is not perceived by human vision, it serves to cancel out visually influential factors of the input image such as image noise and a gradation step (quasi-outline) in accordance with the kind (grain level) of the input image.

Where the noise generating means 4 is composed of the reference noise storing means 4a, noise amplification value storing means 4b, and noise amount calculating means 4c, first the noise selecting means 3 receives an instruction corresponding to the kind of an original document, and selects a noise spatial response characteristic and an amplification value table corresponding to the kind of the original document from the reference noise storing means 4a and the noise amplification value storing means 4b. At the same time, part of an image signal G that is produced by the image input means 1 is supplied to the noise amount calculating means 4c. Then, a noise amplification value corresponding to the value of the image signal G is called from the noise amplification value table selected by the noise selecting means 3. At the same time, the noise data selected from the reference noise storing means 4a is also supplied to the noise amount calculating means 4c. The noise amount calculating means 4c calculates a noise amount based on the received noise amplification value and noise data.

In the mode of dealing with a color image signal, the apparatus operates in the following manner in the case where the color components separating means 7 and the noise superimposing means 6 for superimposing noise separately for each color component are provided and the noise generating means 4 is composed of the reference noise storing means 3a, color component noise storing means 4d and color component noise amount calculating means 4e.

A color image signal G is separated into color components in a color space, for instance, into a lightness information signal and chromaticity information signals in the uniform color space L*a*b*, which are sent to the color component noise amount calculating means 4e and the noise superimposing means 6. The, noise amplification values corresponding to the lightness information signal and the chromaticity information signals are called from the color component noise amplification value storing means 4c. At the same time, noise data stored in advance in the reference noise storing means 4a are also supplied to the color component noise amount calculating means 4e. The color component noise amount calculating means 4e calculates noise amounts corresponding to the lightness information signal and the chromaticity information signals based on the received noise amplification value and the noise data, and supplies noise corresponding to the lightness information signal and the chromaticity information signals to the noise superimposing means 6. Then, the noise superimposing means 6 independently superimposes noise on both of the lightness information signal and the chromaticity information signals, or on either of those signals.

DESCRIPTION OF THE PREFERRED EMBODIMENTS

The present invention will be described in more detail by way of an embodiment with reference to the accompanying drawings.

Figure 2:
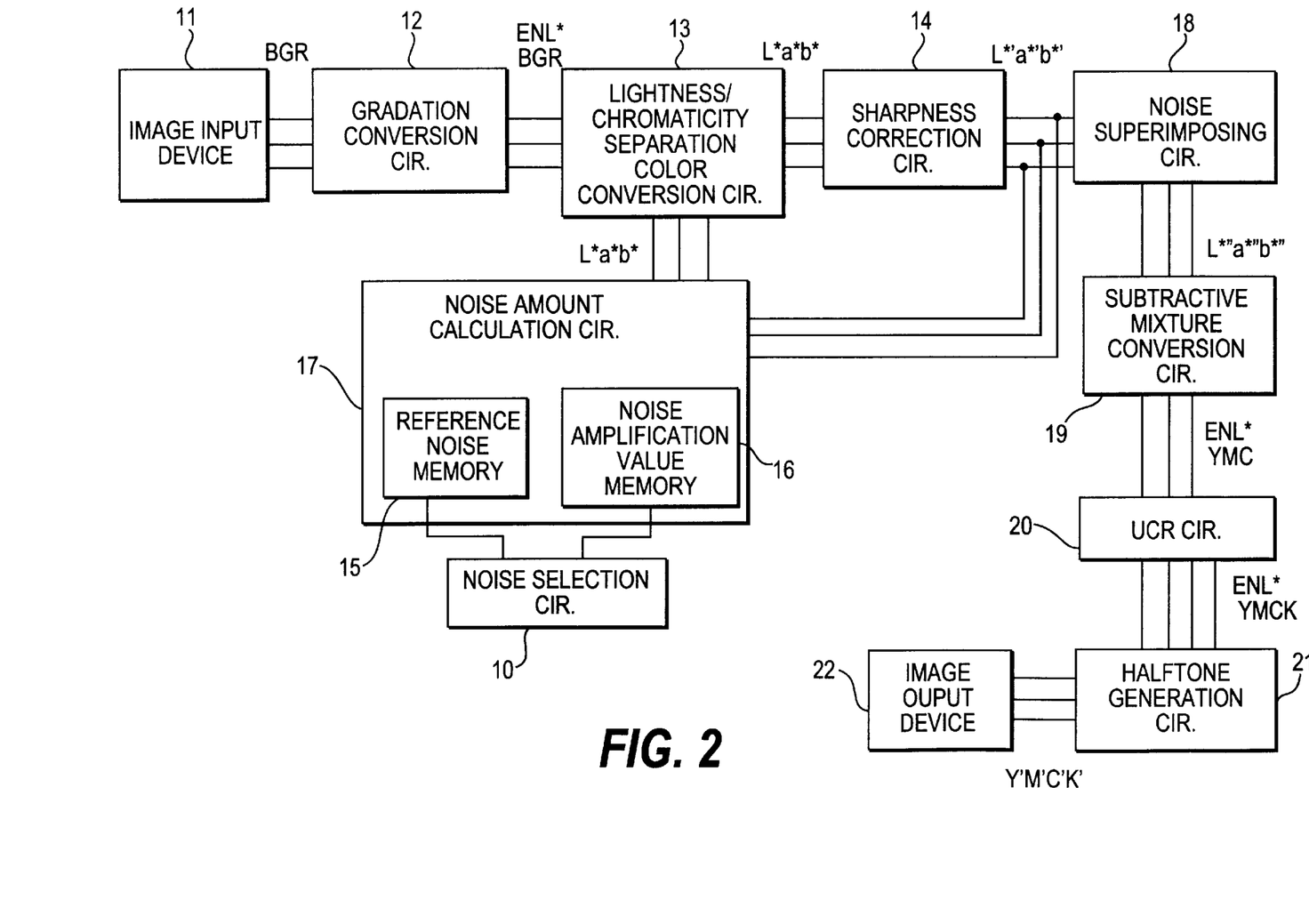
FIG. 2 is a block diagram showing a color image processing apparatus according to an embodiment of the invention.

FIG. 2 shows the entire, general configuration of a color image signal processing apparatus according to an embodiment of the present invention. Referring to FIG. 2, the apparatus consists of the following components. An image input device 11 produces an input color image signal. A gradation conversion circuit 12 converts a gradation level of the input image signal. A lightness/chromaticity separation color conversion circuit 13 separates the converted image signal into a lightness information signal L* and chromaticity information signals a* and b*. A sharpness correction circuit 14 corrects sharpness. A reference noise memory 15 stores reference noise data. A noise amplification value memory 16 stores noise amplifications values corresponding to the lightness information signal and the chromaticity information signals. A noise selection circuit 10 selects and calls noise data corresponding to the kind of an original document and amplification values from the reference noise memory 15 and the noise amplification value memory 16, respectively. A noise amount calculation circuit 17 calculates noise amounts based on the selected noise data and the noise amplification values corresponding to the image signals. A noise superimposing circuit 18 superimposes noise of the amounts calculated by the noise amount calculation circuit 17 on the image signals. A subtractive mixture conversion circuit 19 converts the image signals to subtractive mixture information. A UCR circuit 20 generates black information, and a halftone generation circuit 21 generates halftone. An image output device 22 outputs an image. With the above components, noise data that is stored in advance can be superimposed on image signals in accordance with their levels.

For example, the image input device 11 is a color image input device (such as a color TV camera or a color image scanner) that optically reads a color original document and produces an image signal. The image signal as output from the image input device 11 consists of 8-bit R, G and B components for each pixel.

The gradation conversion circuit 12 has a table for performing equivalent lightness conversion on the R, G and B components of the image signal. The lightness/chromaticity separation color conversion circuit 13 converts the equivalent-lightness-converted R, G and B components to a lightness information signal and chromaticity signals. In this embodiment, the R, G and B components are converted to components of CIE L*a*b* (uniform color space) by a 3×10 matrix operation.

Figure 9:
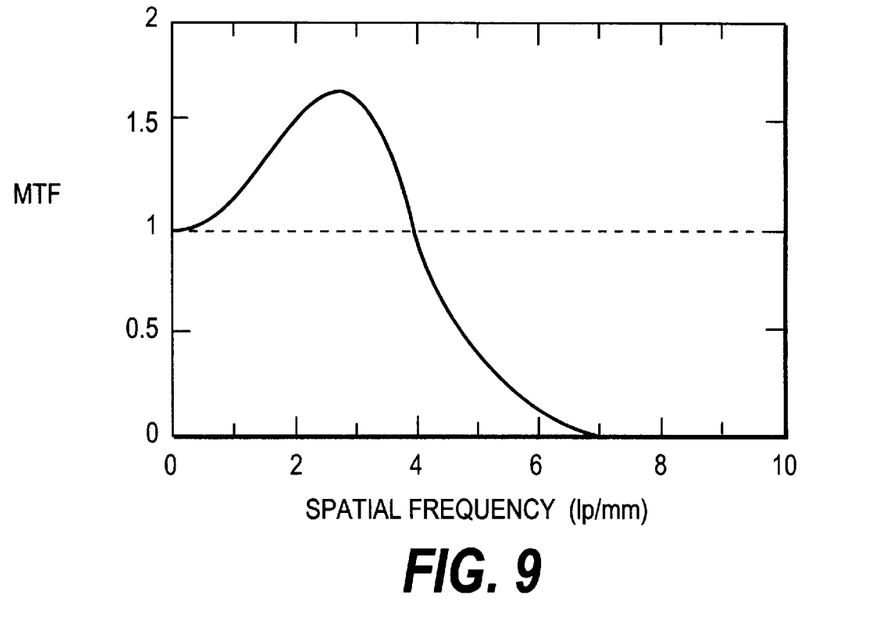
FIG. 9 is a graph showing a characteristic of a sharpness enhancing filter.
Figure 10:
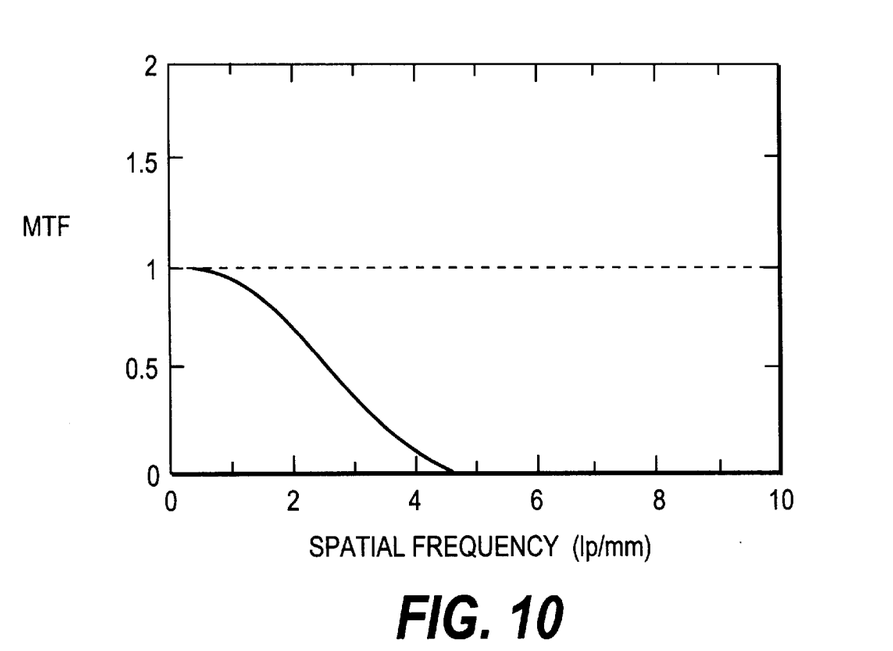
FIG. 10 is a graph showing a characteristic of a sharpness reducing filter.

The sharpness correction circuit 14 is generally implemented by taking a convolution of an unsharpness mask and an image. In this embodiment, the lightness information signal is subjected to sharpness enhancement and the chromaticity information signals are subjected to sharpness reduction by using filters of different characteristics. FIGS. 9 and 10 show examples of spatial frequency characteristics of an unsharpness mask filter. As a result, the sharpness of the L* component is enhanced and that of the a* and b* components are reduced.

Reveiving an instruction from a user corresponding to the kind of an original document, for instance, an instruction indicating whether an original document has been discharged from a particular machine (hereinafter referred to as "self machine"), the noise selection circuit 10 selects and calls a noise spatial frequency characteristic and an amplification value table corresponding to the kind of the instruction-received original document from the reference noise memory 15 and the noise amplification value memory 16.

Figure 5A:
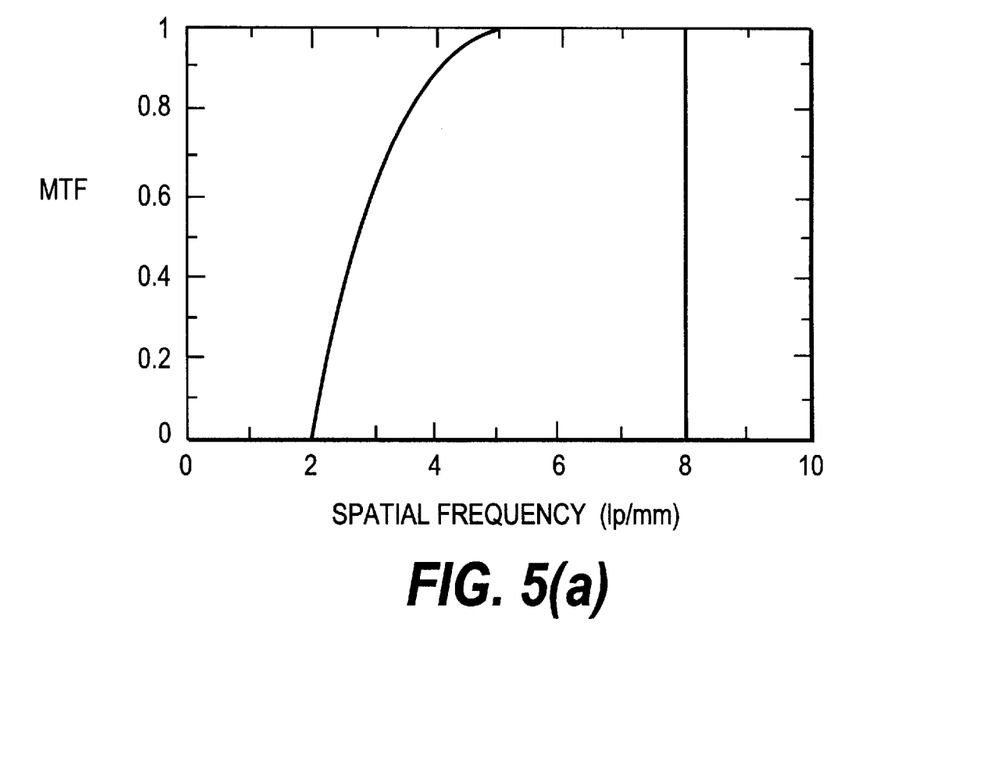
FIG. 5(a) is a graph showing a noise spatial frequency characteristic for a document discharged from the self machine.
Figure 5B:
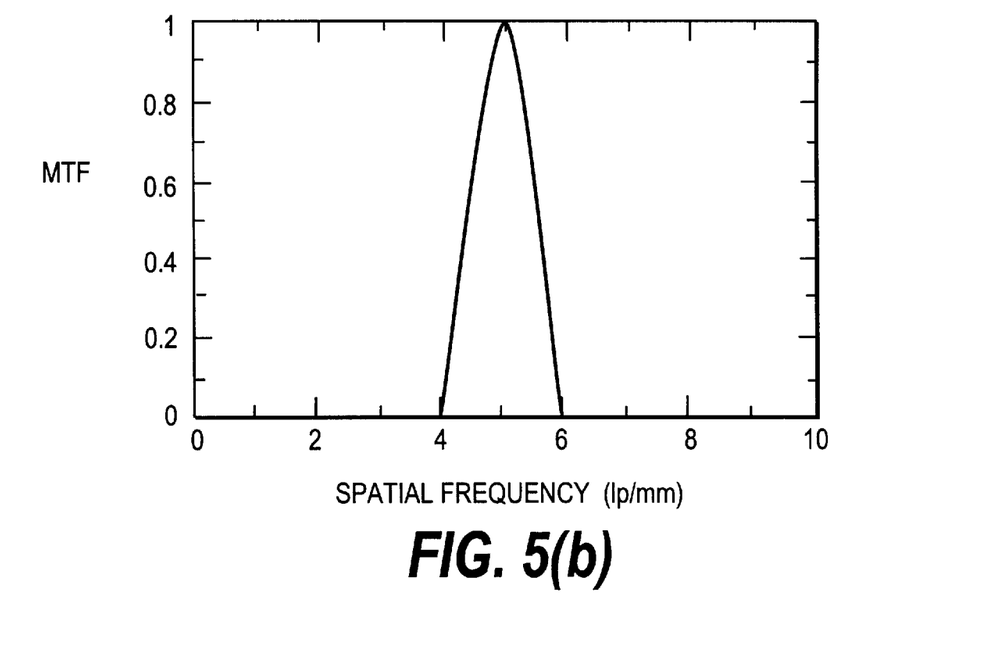
FIG. 5(b) is a graph showing a noise spatial frequency characteristic for other documents.

The reference noise memory 15 is a memory for storing noise data of the number of sections corresponding to kinds of documents. In this embodiment, the memory 15 stores first noise data for a document discharged from the self machine and second noise data for other documents. FIGS. 5(a) and 5(b) show spatial frequency characteristics of noise data used in this embodiment. More specifically, FIG. 5(a) shows the first noise data for a document discharged from the self machine, and FIG. 5(b) shows the second noise data for other documents. The noise data stored in the memory 15 are normalized so that the standard deviation a is equal to 1.

Figure 3:
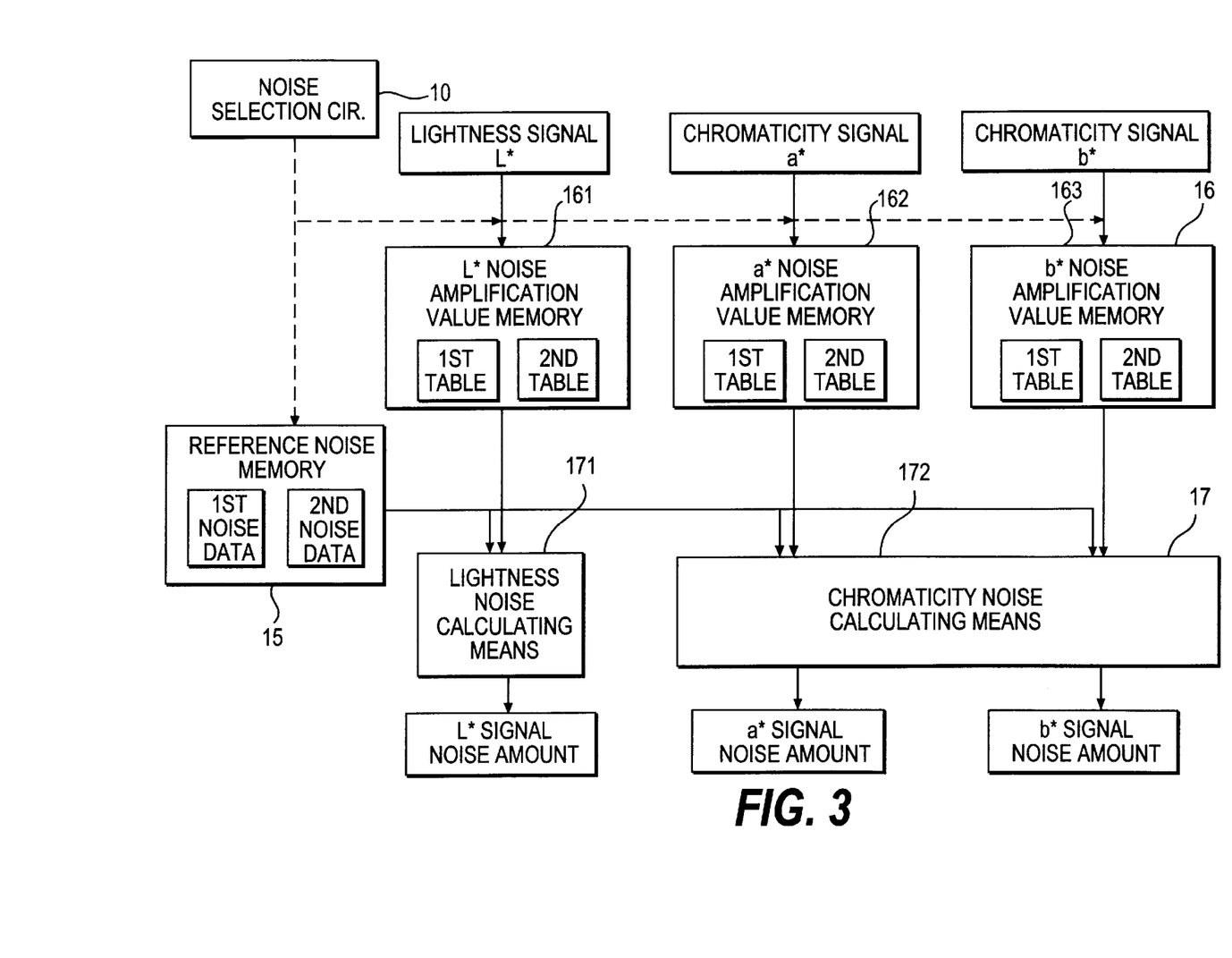
FIG. 3 is a block diagram showing a configuration of a noise amount calculation circuit.
Figure 6A:
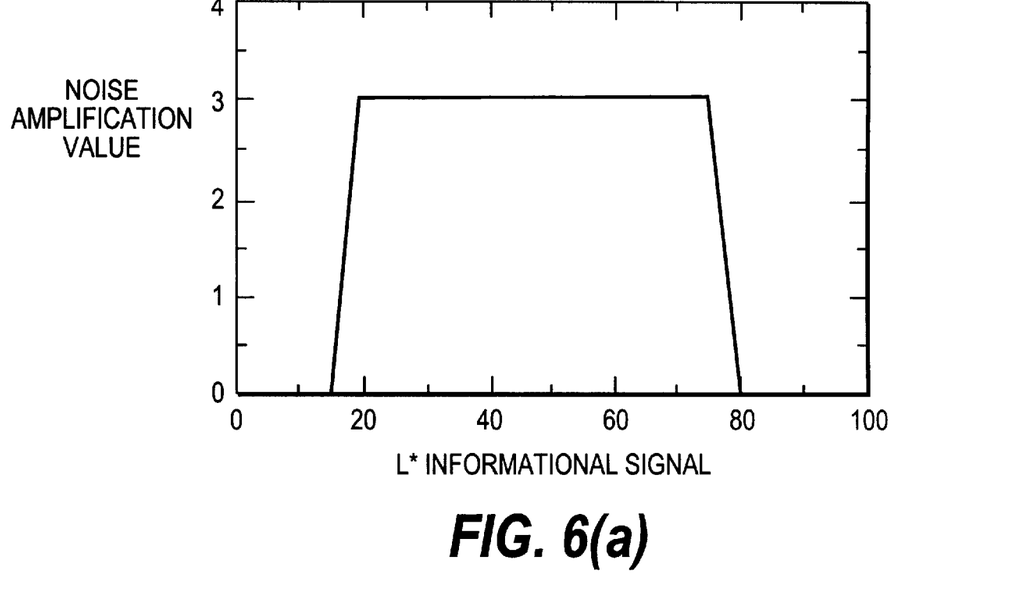
FIG. 6(a) is a graph showing a characteristic of a noise amplification value table for a lightness information signal (L*) to be used for copying an original document discharged from the self machine.
Figure 6B:
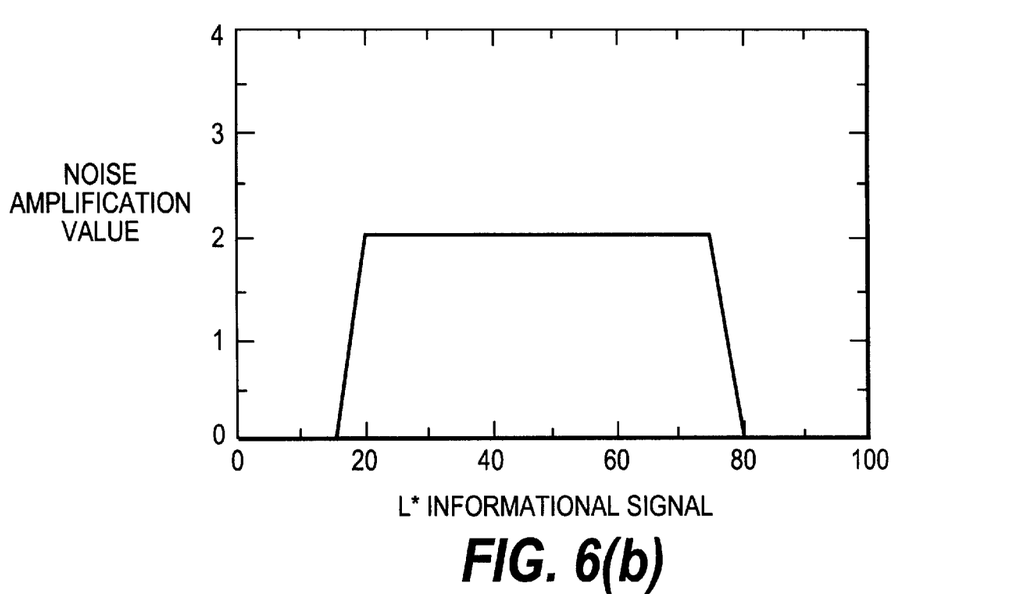
FIG. 6(b) is a graph showing a characteristic of a noise amplification value table for the lightness information signal to be used for copying other original documents.
Figure 7A:
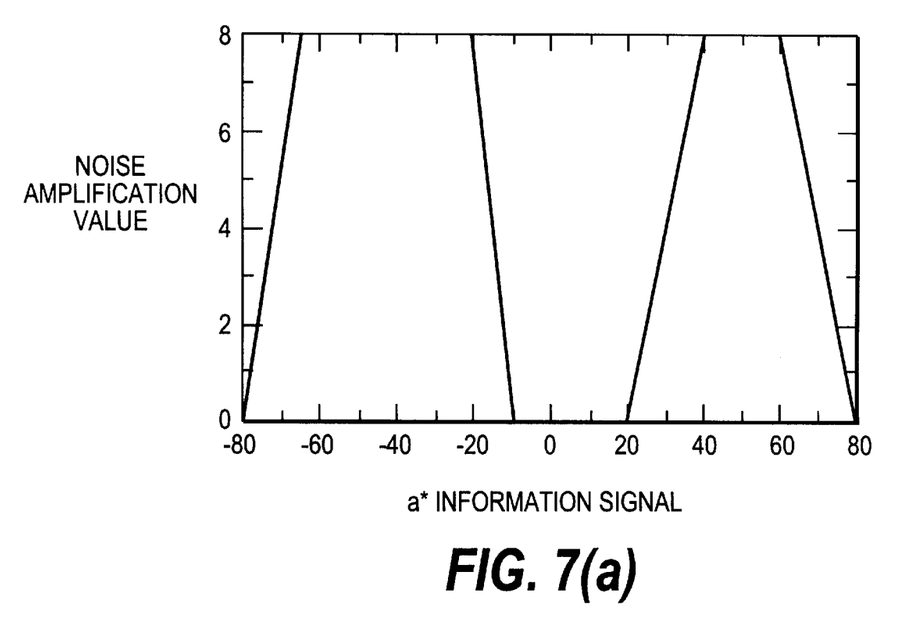
FIG. 7(a) is a graph showing a characteristic of a noise amplification value table for a chromaticity information signal (a*) to be used for copying an original document discharged from the self machine.
Figure 7B:
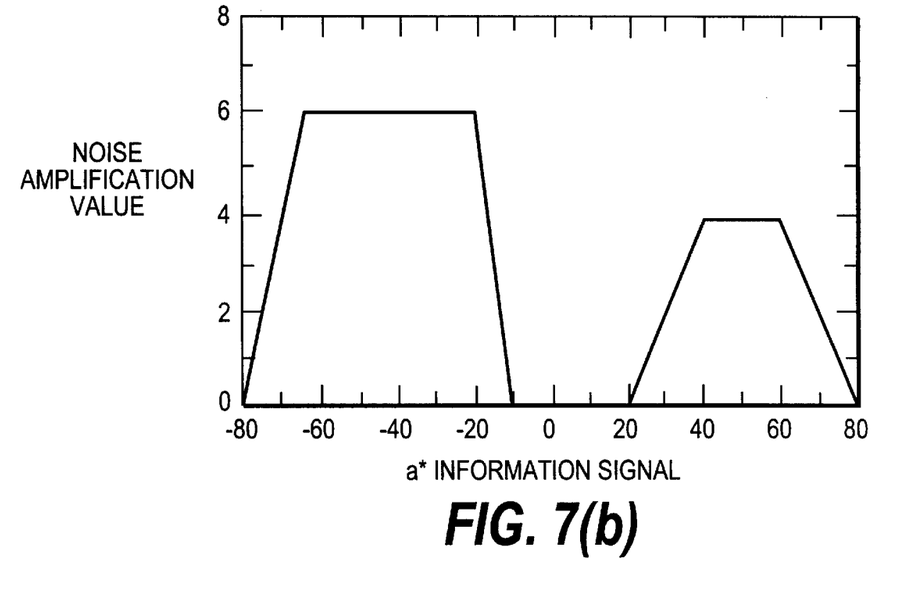
FIG. 7(b) is a graph showing a characteristic of a noise amplification value table for the chromaticity signal (a*) to be used for copying other original documents.
Figure 8A:
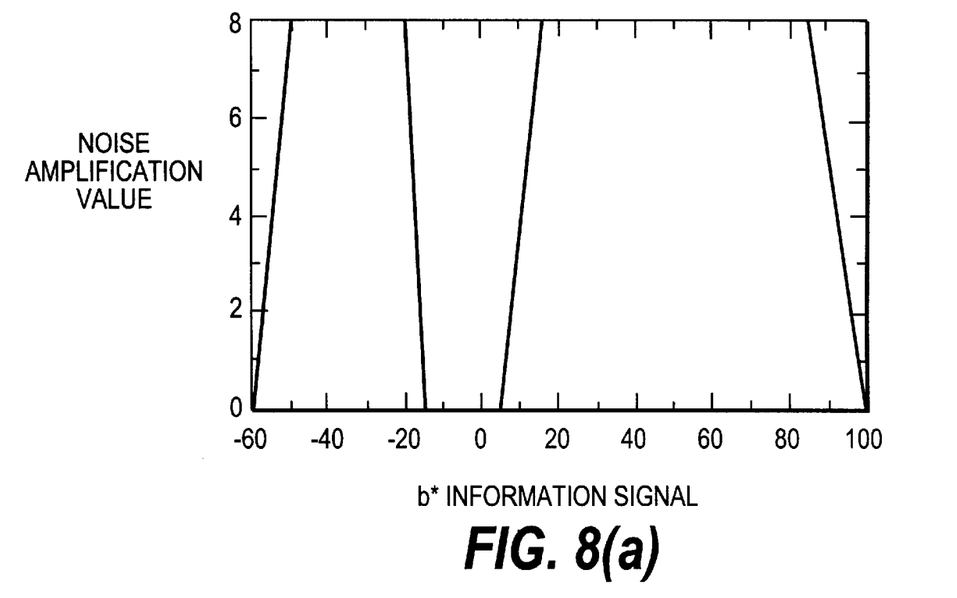
FIG. 8(a) is a graph showing a characteristic of a noise amplification value table for a chromaticity information signal (b*) to be used for copying an original document discharged from the self machine.
Figure 8B:
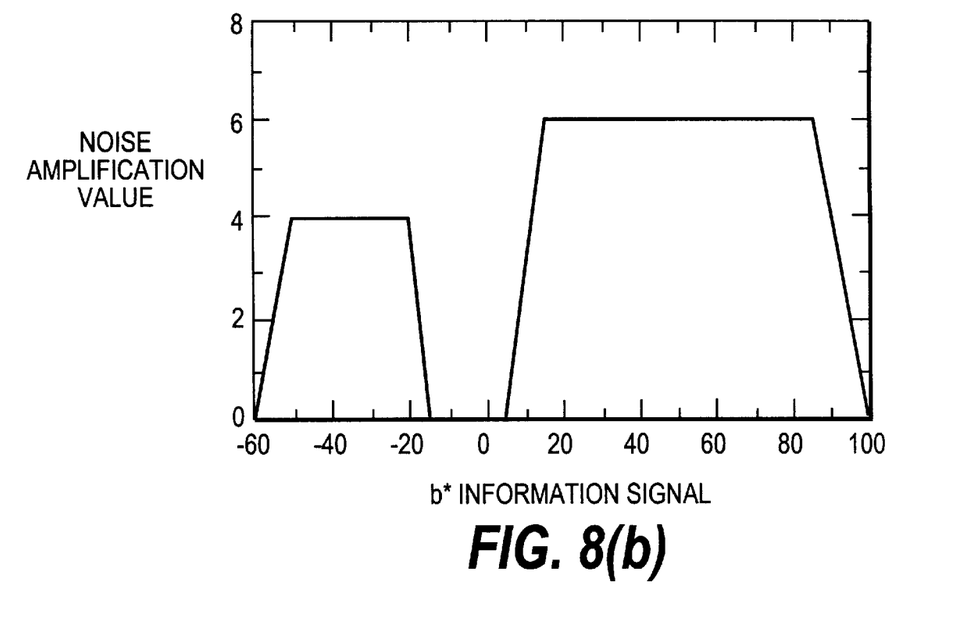
FIG. 8(b) is a graph showing a characteristic of a noise amplification value table for the chromaticity signal (b*) to be used for copying other original documents.

Referring to FIG. 3, the noise amount calculation circuit 17 is composed of a lightness noise amplification value memory 161 for storing a first noise amplification value table for a lightness information signal (L* in this embodiment) and a document discharged from the self machine, a second noise amplification value table for a lightness information signal and other documents; chromaticity noise amplification value memories 162 and 163 for storing first and second noise amplification value tables (meanings of "first" and "second" are the same as the above) for chromaticity information signals (a* and b* in this embodiment); a lightness noise amount calculating means 171; and a chromaticity noise amount calculating means 172. FIGS. 6(a) through 8(b) show noise amplification characteristics used in this embodiment. More specifically, FIG. 6(a) shows a characteristic of a noise amplification value table for the lightness information signal (L*) to be used for copying an original document discharged from the self machine, and FIG. 6(b) shows a characteristic of a noise amplification value table for the lightness information signal to be used for copying other original documents. FIG. 7(a) shows a characteristic of a noise amplification value table for the chromaticity information signal (a*) to be used for copying an original document discharged from the self machine, and FIG. 7(b) shows a characteristic of a noise amplification value table for the chromaticity signal (a*) to be used for copying other original documents. FIG. 8(a) shows a characteristic of a noise amplification value table for the chromaticity information signal (b*) to be used for copying an original document discharged from the self machine, and FIG. 8(b) shows a characteristic of a noise amplification value table for the chromaticity signal (b*) to be used for copying other original documents.

First the noise selection circuit 10 calls the first noise data or second noise data from the reference noise memory 15 depending on whether a document is one discharged from the self machine. At the same time, the noise selection circuit 10 selects the first noise amplification value tables or the second noise amplification value tables from the L* noise amplification value memory 161, the a* noise amplification value memory 162 and the b* noise amplification value memory 163. Then, noise amplification values corresponding to the respective image signals input to the noise amount calculation circuit 17 are called from the noise amplification value tables selected above, and subjected to an operation of Equation (1) with the noise data input from the reference noise memory 15.

$$NOISE_{L(x, y)} = LUT_L(L_{(x, y)}) \times NOISE_{(x, y)}$$

$$NOISE_{a(x, y)} = LUT_a(a_{(x, y)}) \times NOISE_{(x, y)}$$

$$NOISE_{b(x, y)} = LUT_b(b_{(x, y)}) \times NOISE_{(x, y)}$$

$$NOISE_{C(x, y)} = \{NOISE_{a(x, y)}^2 + NOISE_{b(x, y)}^2\}^{1/2}$$

$$NOISE'_{a(x, y)} = \text{sign}(NOISE_{(x, y)}) \times NOISE_{C(x, y)} \times |a_{(x, y)}| / \{a_{(x, y)}^2 + b_{(x, y)}^2\}^{1/2}$$

$$NOISE'_{b(x, y)} = \text{sign}(NOISE_{(x, y)}) \times NOISE_{C(x, y)} \times |b_{(x, y)}| / \{a_{(x, y)}^2 + b_{(x, y)}^2\}^{1/2} \quad (1)$$

where
x=1, 2, ..., (total number of pixels in the X direction)
y=1, 2, ... (total number of pixels in the Y direction)

In Equation (1), $L_{(x, y)}$, $a_{(x, y)}$ and $b_{(x, y)}$ are (x, y)th image signals. $LUT_L$, $LUT_a$ and $LUT_b$ are L*, a* and b* noise amplification value tables, respectively. $NOISE_{(x, y)}$ is (x, y)th noise data. $NOISE_{L(x, y)}$ is a noise amount for (x, y)th lightness data $L_{(x, y)}$, and $NOISE_{a(x, y)}$ and $NOISE_{b(x, y)}$ are noise amounts for (x, y)th chromaticity data $a_{(x, y)}$ and $b_{(x, y)}$, respectively. $NOISE_{C(x, y)}$ is a chroma-axis noise amount calculated from the noise amounts for the (x, y)th chromaticity data $a_{(x, y)}$ and $b_{(x, y)}$. $NOISE'_{a(x, y)}$ and $NOISE'_{b(x, y)}$ are noise amounts for the (x, y)th chromaticity data $a_{(x, y)}$ and $b_{(x, y)}$, respectively in the case where noise is superimposed only in the chroma-axis direction. The parameter sign ($NOISE_{(x, y)}$) is a sign (positive or negative) of the (x, y)th noise data. The noise amounts for the input image signals are calculated in the above manner, and resulting noise is supplied to the noise superimposing circuit 18.

Figure 4:
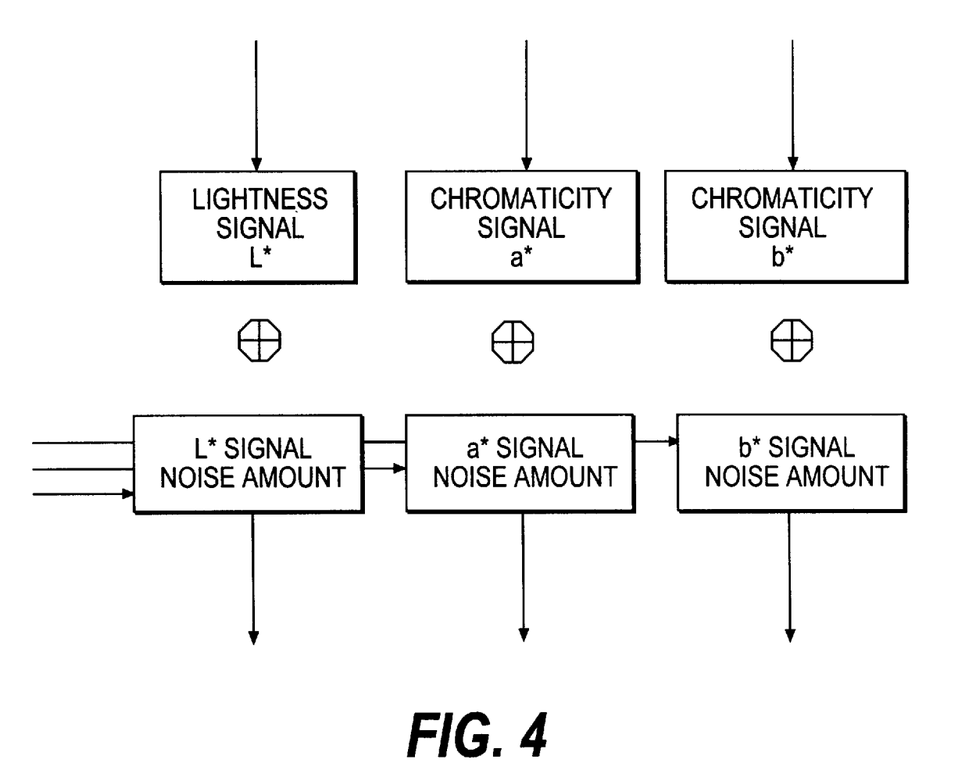
FIG. 4 is a block diagram showing an operation of a noise superimposing circuit.

The noise superimposing circuit 18 superimposes the received noise on the image signals in a manner shown in FIG. 4. The noise is superimposed according to Equation (2).

$$L'_{(x, y)} = L_{(x, y)} + NOISE_{L(x, y)}$$

$$a'_{(x, y)} = a_{(x, y)} + NOISE'_{a(x, y)}$$

$$b'_{(x, y)} = b_{(x, y)} + NOISE'_{b(x, y)} \quad (2)$$

where
x=1, 2, ..., (total number of pixels in the X direction)
y=1, 2, ..., (total number of pixels in the Y direction)

Finally, the noise-superimposed image signals are sent, via the subtractive mixture color conversion circuit 19, UCR circuit 20 and halftone generation circuit 21, to the image output device 22, which outputs an image.

Figure 11:
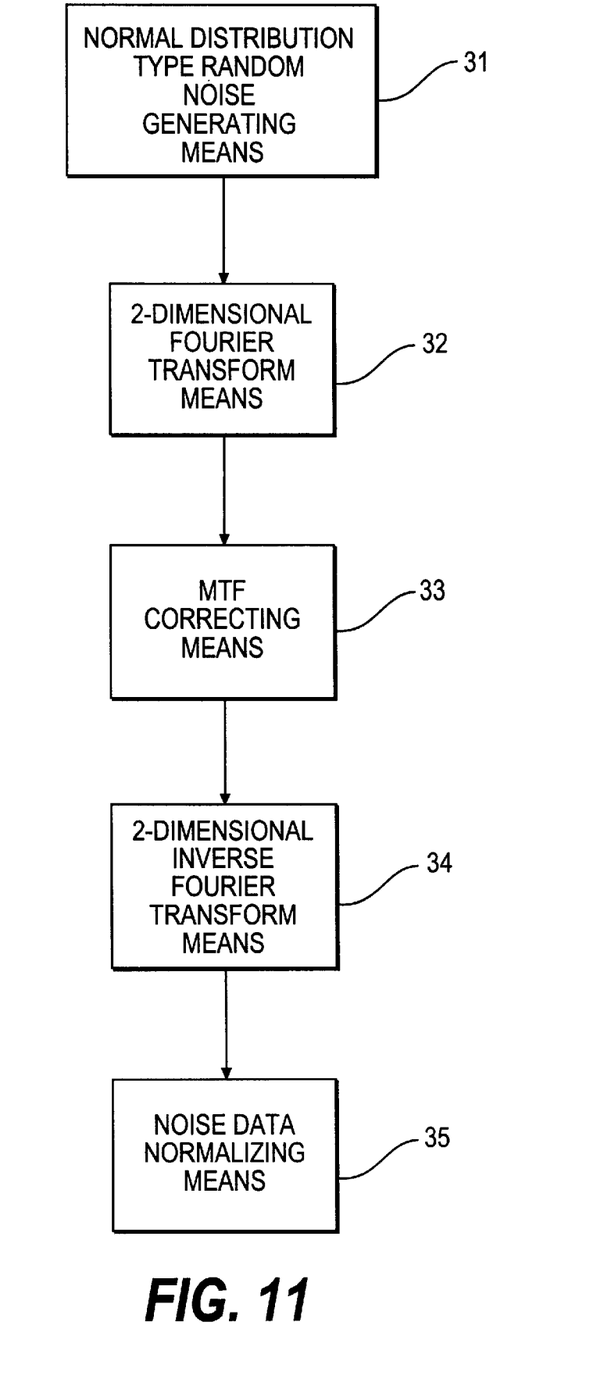
FIG. 11 shows an example of generating noise data.

FIG. 11 shows an example of generating noise data in this embodiment. A normal distribution type random noise generating means 31 generates ransom noise data according to the Box & Muller algorithm represented by Equation (3).

$$u_1 = RND(1)$$

$$u_2 = RND(2)$$

$$NOISE_{(x, y)} = (-2 \times \log u_1)^{1/2} \times \cos(2\pi u_2) \quad (3)$$

where
x=1, 2, ..., (total number of pixels in the X direction)
y=1, 2, ..., (total number of pixels in the Y direction)

In Equation (3), RND(a) and RND(2) are uniform random numbers generating functions.

A two-dimensional Fourier transform means 32 performs two-dimensional Fourier transform on the random noise data sent from the means 31, and a MTF correcting means 33 corrects a spatial frequency characteristic. FIGS. 5(a) and 5(b) show an example of MTF characteristics used in this embodiment. A two-dimensional inverse Fourier transform means 34 returns the noise data to real space data, which is then normalized by a noise data normalizing means 35 so that the standard deviation σ becomes equal to 1.

In the above embodiment, noise is superimposed independently for the lightness axis and chroma axis. Alternatively, noise may be superimposed independently for L*, a* and b* axes, or interactively for those axes.

As described above, according to the invention, utilizing the noise perceptual characteristics of a human, not only the gradation reproduction performance can be improved for an original document of any. graininess level without deteriorating the hue or sharpness but also image noise, a gradation step (quasi-outline), etc. existing in an original document can be canceled out by superimposing a small amount of high-frequency-band noise that is less recognizable by human vision on an image signal when an original document (such as a printed document or a photographic document) includes little image noise and, conversely, positively superimposing random noise excluding a very-low-frequency-band component on an image signal when an original document (such as an generation image) includes image noise. Thus, an image superior in visual performance can be obtained.

What is claimed is:

1. An image signal processing apparatus for converting an input image signal that is received from an image input device to an output image signal that is suitable for an image output device, comprising:

reference noise storing means for storing a plurality of noise data having different spatial frequency characteristics corresponding to respective kinds of original documents;

noise amplification value storing means for storing a plurality of noise amplification value tables corresponding to the respective kinds of original documents;

noise selecting means for selecting one of the plurality of noise data and one of the plurality of noise amplification value tables in accordance with a kind of the input image signal;

noise amount calculating means for calculating an amount of noise based on the selected noise data and the selected noise amplification value table, to thereby produce noise; and noise superimposing means for superimposing the noise on the input image signal.

2. The image signal processing apparatus of claim 1, wherein the reference noise storing means stores first noise data having a spatial frequency characteristic for an original document discharged from a particular image reproduction machine and second noise data having a spatial frequency characteristic for other original documents; the noise amplification value storing means stores first noise amplification value table for the original document discharged from the particular image reproduction machine and second noise amplification value table for the other original documents; and the noise selecting means receives an instruction indicating whether the input image signal is one produced from the original document discharged from the particular image reproduction machine, and selects the first noise data and the first noise amplification value table if the input image signal is the one produced from the original document discharged from the particular image reproduction machine, and selects the second noise data and the second noise amplification value table if the input image signal is not the one produced from the original document discharged from the particular image reproduction machine.

3. A color image signal processing apparatus for converting an input color image signal that is received from an image input device to an output color image signal that is suitable for an image output device, comprising:

reference noise storing means for storing a plurality of noise data having different spatial frequency characteristics corresponding to respective kinds of original documents;

noise amplification value storing means for storing a plurality of noise amplification value tables corresponding to respective combinations of the kinds of original documents and components of the input color image signal;

noise selecting means for selecting one of the plurality of noise data and a set of noise amplification value tables from the plurality of noise amplification value tables in accordance with a kind of the input color image signal;

noise amount calculating means for calculating amounts of noise based on the selected noise data and the selected set of noise amplification value tables, to thereby produce noises for the respective components of the input color image signal; and noise superimposing means for superimposing the noises on the respective components of the input color image signal.

4. The color image signal processing apparatus of claim 3, wherein the components of the input color image signal are a lightness signal and chromaticity signals in the CIE L*a*b* space.

* * * * *